July 28, 1942.  C. J. HODAPP ET AL  2,290,965

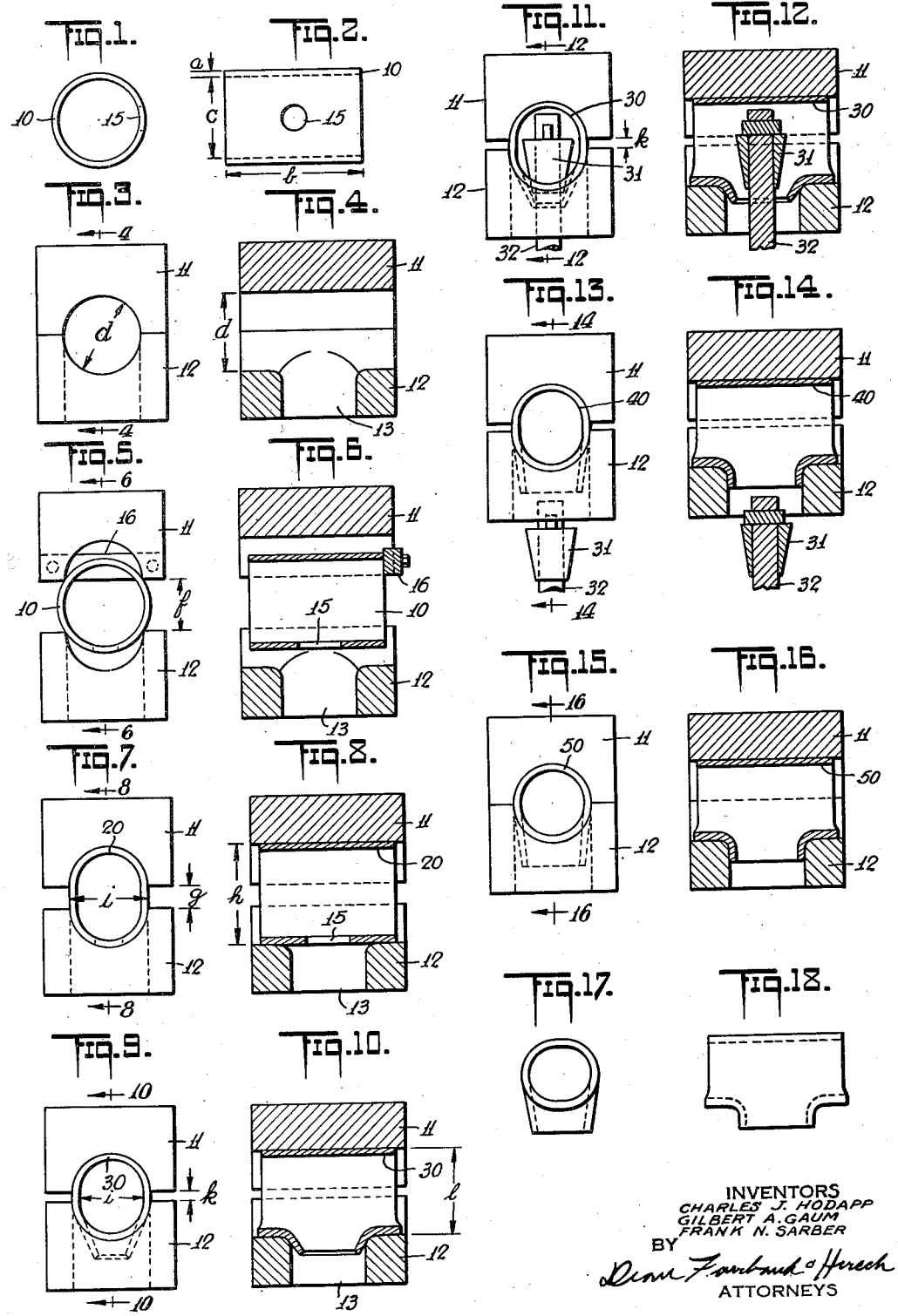

MANUFACTURE OF TEES

Filed April 9, 1940  2 Sheets-Sheet 2

INVENTORS
CHARLES J. HODAPP
GILBERT A. GAUM
FRANK N. SARBER
BY
ATTORNEYS

Patented July 28, 1942

2,290,965

UNITED STATES PATENT OFFICE 2,290,965

MANUFACTURE OF T'S

Charles J. Hodapp, Gilbert A. Gaum, and Frank N. Sarber, Louisville, Ky., assignors to Tube Turns, Louisville, Ky., a corporation of Kentucky Application April 9, 1940, Serial No. 328,654

9 Claims. (Cl. 29—157)

This invention relates to the art of manufacturing branch fittings from tubular stock of a circumferential periphery greater than that of the fitting to be produced therefrom.

It is contemplated that many different forms of branch fittings, such as T's, crosses, Y's and the like, may be made in accordance with the teachings of this invention but for purposes of disclosure the invention is described as being used in the manufacture of T's. The tubular stock to be employed may be seamless or welded tubing of any workable metal and may be concentric or eccentric in cross section.

It has long been known that fittings may be made from oversize tubular stock but so far as we are aware, all such methods have required the use of mandrels or dies disposed internally of the tubular stock and have entailed the collapsing of the tube over such mandrel or die, and have resulted frequently in the stretching and weakening of the metal in the region of the outlet of the fitting.

The present invention involves an entirely new process for the displacement of the excess metal of the oversize tubular stock, and avoids many of the difficulties found in the attempt to follow the teachings of the prior art.

As one object, the invention involves a process of making branch fittings in which the excess metal of the stock is caused to take a normal flow substantially exclusively under externally applied compression forces into the region wherein the branch is to be formed.

Another object is the provision of a process in which the outline of the branch of a fitting is formed by the external application of compression forces to tubular members of substantial wall thicknesses in non-uniformly heated condition.

Another object is the provision of a process for forming branch fittings from oversize tubular stock in which the flow of excess metal resulting substantially exclusively from the application of external compression forces causes a simultaneous thickening of a wall of the stock, a lengthening of one side of the stock and a building of the branch of the fitting.

Another object is the provision of a process in which the metal flow resulting from the application of external compression forces to the tubular member is substantially unconfined along the longitudinal axis of said tubular member.

A further object is to provide a process for the manufacture of branch fittings of ferrous or nonferrous material, which may be carried out with a minimum of time and labor by means of simple and easily operable apparatus requiring no elaborate controls or complex positioning, holding or forming means, and in which process there may be employed either a plurality of sets of dies or a single set of dies, it being possible to carry out the manufacture of standard, extra heavy and double extra heavy fittings on one and the same set of dies, if desired.

A still further object is the provision of a process for the manufacture of hollow fittings, wherein no internal die mandrel is employed, the formation of the outline of the fittings being accomplished solely by pressure exerted by external die means.

It is also an object to provide a hollow fitting blank which requires the removal of only a small amount of metal in the course of the final forging and machining operations, although in the practice of the invention blanks may be produced of such thickness that, if desired, they may be machined into fittings of various lesser thicknesses.

Other objects and advantages will become more apparent when considered in conjunction with the accompanying drawings, in which Fig. 1 is an end view of a section of tubular stock suitable for the manufacture of fittings in accordance with the invention;

Fig. 2 is a side view thereof;

Fig. 3 is an end view of one form of external die which may be employed;

Fig. 4 is a section on the line 4—4 of Fig. 3;

Fig. 5 is a view showing the positioning of the stock shown in Fig. 1 in the die shown in Fig. 3;

Fig. 6 is a section on the line 6—6 of Fig. 5;

Figs. 7 and 8 correspond to Figs. 5 and 6 but show the deformation of the tubing and position of the dies at the conclusion of the blank forming operation;

Figs. 9 and 10 correspond to Figs. 7 and 8 but show the position of the dies and the deformation of the blank at the conclusion of the initial forging operation;

Figs. 11 and 12 show the partially formed T and the dies preparatory to the expanding operation on the branch outlet in the manufacture of certain types of T's.

Figure 19:
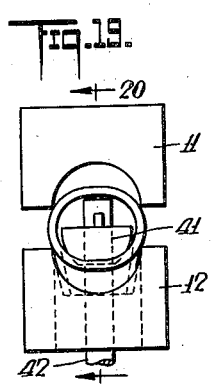
Figure 20:
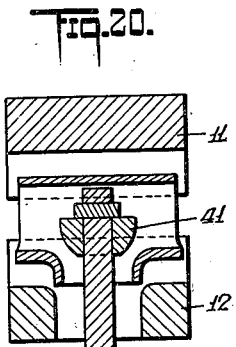
Figure 25:
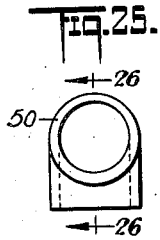
Figure 26:
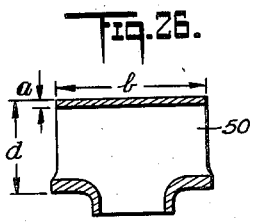
Figure 21:
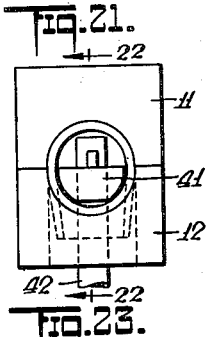
Figure 22:
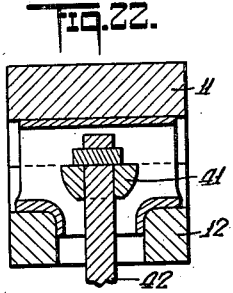
Figure 27:
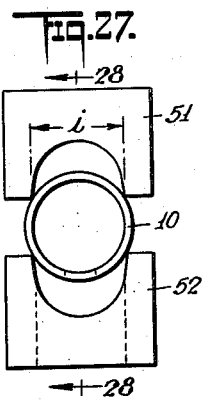
Figure 28:
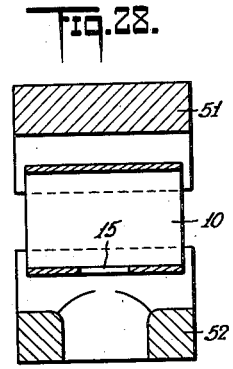
Figure 23:
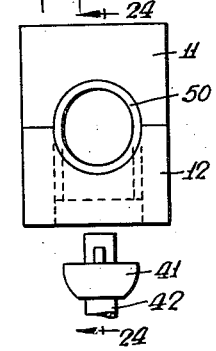
Figure 24:
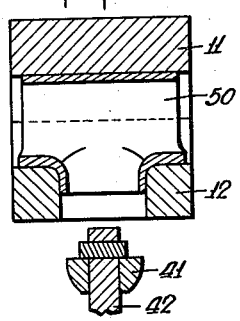
Figure 29:
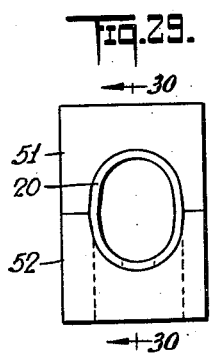
Figure 30:
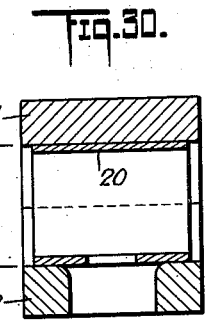

Figs. 13 and 14 correspond to Figs. 11 and 12 but show the parts after a partial expanding or branch flaring operation;

Figs. 15 and 16 show the position and shape of the parts when the dies are fully closed;

Figs. 17 and 18 are end and side views respectively of an unfinished T deformed for insertion of a full size final sizing means;

Figs. 19 and 20 are views similar to Figs. 11 and 12 but show the parts in position for operation on the partially formed T shown in Figs. 17 and 18;

Figs. 21 and 22 correspond to Figs. 19 and 20 but show the parts after the die has been closed;

Figs. 23 and 24 are views of the dies and T at the conclusion of the T forging operation;

Fig. 25 is an end view of a formed T prior to the finishing operation;

Fig. 26 is a longitudinal section on the line 26—26 of Fig. 25;

Figs. 27 and 28 are similar to Figs. 5 and 6 but show dies of somewhat different form; and Figs. 29 and 30 are similar to Figs. 27 and 28 but show the dies in closed position.

Merely as one example of the invention, a tube section such as shown in Figs. 1 and 2 may be converted into a T as shown in Figs. 25 and 26. In this specific example, the T has a uniform center to face dimension and equal size outlets. Such a T may have any desired wall thickness such as standard, extra heavy, or double extra heavy. It is to be expressly understood that our invention is not limited in any way to this particular example because it will be apparent to those skilled in the art that this invention is applicable to the manufacture of T's or other branch fittings of various metals and having a variety of wall thicknesses, center to face dimensions, and relative sizes of outlets.

Assuming that the manufacturer is desirous of producing the T 50 of ferrous metal shown in Figs. 25 and 26 having a standard wall thickness $a$ with an outside diameter $d$ and a length $b$, the tubular stock 10 chosen in Figs. 1 and 2 will also have a wall thickness which is substantially the dimension $a$ and a length which is substantially the length $b$, but will have an outside diameter $c$ which is greater than the dimension $d$.

It will be understood that the terms "tubular" and "oval" as used herein are intended to describe generally any geometric shape of hollow form without limitation to true circular or elliptical shapes. For example, the bore of stock 10 may be concentric or eccentric with respect to the walls, and the sides of oval blank 20 shown in Figs. 7 and 8 may be tangent to the curved portions thereof.

External female dies having an upper portion 11 and a lower portion 12 are provided for the reception of the stock from which the T is to be made and as one significant feature of our invention it will be noted that it is possible to employ the same set of dies 11 and 12 throughout the entire process of manufacture. However, as will later appear, it is also possible to employ a plurality of sets of dies which may completely close upon each other or approximately close at each phase of operation. One use of such dies may be found in the manufacture of thin wall fittings as later to be described.

In making the article shown in Figs. 25 and 26 wherein no special reinforcement of the T body is desired these dies, when in contact, may provide a true cylindrical recess having a diameter $d$ together with a recess in one of said dies for the outlet portion of the T. However, when it is desired to provide additional wall thickness at any point as, for example, at the sides of the T, the dimensions of the recess in said dies may be varied so that the dies have an internal dimension which is greater than diameter $d$ and which will result in a final product which will have thicker side walls.

As a preliminary step in the manufacture of the T, an aperture 15 may first be made in the wall of the tubular stock 10 with the center of the aperture corresponding substantially to the location of the center of the outlet to be formed. The size and configuration of aperture 15 may be widely varied, depending upon the size and type of T to be formed and forms no essential feature of the invention. Prior to, during or following, the formation of the aperture the stock 10 will be heated to the proper forging temperature which preferably involves a uniform heating of the entire stock. The stock is then placed between the separable dies 11 and 12 and positioned therein by means of any suitable detachable positioning means 16, with the aperture 15 located above the outlet space 13 in the proper die. Dies 11 and 12 may be arranged vertically or in any other suitable location and either or both of said dies may be movable to and away from the other by any suitable source of power or either die may be held stationary with the other die movable.

With the stock in place, the dies will be held apart a distance $f$ as shown in Figs. 5 and 6. Upon moving the dies relatively closer to each other to the distance $g$ with the resulting application of external compression forces to the stock, the stock 10 takes the form of an oval shaped blank 20 shown in Figs. 7 and 8 while retaining the same wall thickness $a$ and length $b$ and without collapsing or wrinkling of the tubular shape. It is contemplated that the foregoing steps may be conducted entirely independently of the immediate manfacturing steps now to be described so that a blank of the form shown in Figs. 7 and 8 may be used by a manufacturer without the necessity of these preparatory steps whenever such a prepared blank is available to him.

However, when the manufacturer is conducting the entire process in sequence on a ferrous material of substantial wall thickness, the hot blank 20 with an outside diameter $i$ slightly greater than $d$ along the minor axis and a diameter $h$ equal to the sums of diameter $d$ and distance $g$ along the major axis, may immediately be subjected to a treatment resulting in a non-uniformity of heat throughout the body of such blank.

It is found that an appreciable displacement of ferrous metal with substantial length of outlet neck into the outlet region of blank 20, in order to form the outline of the T by application of compression forces, can take place only when the side of blank 20 on which the outlet is located, and particularly the region near which the outlet is to be formed, is at a higher temperature than the rear and side walls of blank 20. The invention, therefore, contemplates a selective heating or cooling or both of blank 20 prior to subsequent operations. Merely as an example, the rear and side walls of blank 20 which enter the die 11 as shown in Figs. 7 and 8 may be quenched to the desired extent and the thus non-uniformly heated blank may be replaced in dies 11 and 12 of Fig. 7 without the necessity of separate reheating. On the other hand, it may be desirable to attain this non-uniformity of heat by means of surface or other type of heating applied to the blank portions which enter the die 12. Any suitable means and method of applying heat may be used and the boundary between the heated and/or cooled portions may be widely varied without departing from our invention. It is found that subsequent metal flow is largely dependent upon the difference of heat existing in the various portions of blank 20 and selective heating may also be used when desired to insure the proper displacement of metal to form any of the various wall thicknesses desired in the final product.

When the non-uniformly heated blank 20 is then subjected to compression forces by dies 11 and 12 as they are moved relatively toward each other to a distance k, shown in Figs. 9 and 10, certain significant displacements of metal occur which make possible the expeditious and efficient later steps of manufacture and distinguish our invention over other known methods.

It is believed that this result is secured because the application of compression forces substantially exclusively to the exterior of the blank 20 causes the excess metal in the oversize blank to take a normal path of flow into the outlet region 13 of the branched fitting and simultaneously thickens the wall of such fitting at those portions where reinforcement customarily is desired. Due to this displacement of the metal to the locations where it is to be used, a greater simplification is obtained for all later forging steps.

It appears that the arch of relatively cold metal of blank 20 in the die 11 serves to direct the application of the compression forces to the opposite arch of relatively hot metal in the die 12 in such a way that the hot metal simultaneously undergoes the normal and partially compensatory actions of thickening the lower wall of the blank, flowing into the unconfined die space 13 for the outlet, and flowing to a slight extent endwise of the longitudinal axis of the blank. The presence of an aperture in the side of the blank during this metal displacement also appears to assist in the directing of the flow of metal and the prevention of a thinning of the walls of the outlet neck, but in its broader aspects the invention may be carried out in the absence of the aperture at this stage of operation.

At the conclusion of this important step of the invention, the partially formed T 30 is then removed from the dies for use in final operations later to be described. Although the wall upon the side containing the outlet has been somewhat increased both in thickness and length, it will be noted that the wall portion corresponding to the cold arch of blank 20 is substantially unchanged as regards wall thickness and length and moreover, the tubular shape has not collapsed inwardly despite the absence of an internal mandrel means. Moreover, it is found that the general outline of the T has been formed with a neck outlet of appreciable length and of substantial wall thickness, and that the formation of this neck has been accomplished without stretching or thinning of the metal in said outlet region.

It will be noted at this point that in cross section the partially formed T 30 shown in Figs. 9 and 10 has a transverse outer diameter $i$ which is slightly larger than $d$ due to the fact that the application of the compression forces on the arch of metal above the boundary between the hot and cold portions of the blank normally tends to bulge the shape outwardly. In order to avoid any possibility of collapsing of the shape inwardly, it is desirable to maintain this diameter of greater value than $d$ until the dies are able to close completely. As will be noted in Figs. 27 to 30 wherein modified dies adapted to close at an earlier stage are employed, the same practice will preferably be observed. The shape of the outlet neck shown in Figs. 9 and 10 also will vary depending upon the nature of the T being formed, the stock being used and the aperture 15 cut into the material. In case a reducing outlet T is being formed, the wall of the outlet shown in Fig. 9 will preferably have an outwardly curved concave appearance rather than the straight form as indicated.

As one modification of the above method of making the partially formed T 30, it may be desirable at times to delay the formation of aperture 15 until immediately preceding the step of non-uniform heating of blank 20. In such a case, dies 11 and 12 shown in Figs. 7 and 8 may be moved slightly closer together than distance $g$ and a portion of the metal on the lower side of the blank will take the general outline of the T neck space. Thereafter, the aperture 15 may be made in the center of said portion with a more accurate location and a small savings in metal available for later forging.

Following the formation of the partially formed T 30 the nature of subsequent steps of manufacture will depend upon the wall thickness, size of outlet and type of T to be formed as a final product. Assuming that the type of T 50 shown in Figs. 25 and 26 with a standard wall thickness is to be made from the article 30, a reheating of the partially formed T 30 may then be made and preferably the article is uniformly heated to the desired forging temperature, although selective heating could obviously be used without departing from the invention.

The heated partially formed T 30 may then be inserted in dies 11 and 12 and the dies brought into contact with each other as shown in Figs. 15 and 16, after which a sizing means 41 shown in Figs. 21 and 22 is inserted through an end of the tubular recess of the dies and attached in any suitable manner to a pull rod 42. During the closing of dies 11 and 12 from the distance $k$ of Figs. 9 and 10 to closed position of Figs. 15 and 16, the opening in and length of the outlet neck is enlarged and a small increase in wall thickness particularly on the side of the T containing the outlet takes place.

Upon pulling the sizing means 41 through the thus formed branch outlet of the T as indicated in Figs. 23 and 24, the forging phases of manufacturing the T is completed and the article 50 shown in Figs. 25 and 26 is produced.

Depending upon the nature of the article desired as a final product, the forged article 50 may take various forms. Since it is possible by means of our invention to make double extra heavy articles, it is now possible for the manufacturer to make all articles 50 of this type and then convert them into standard wall and extra heavy wall articles merely by machining either or both of the inner or outer walls thereof. It also is possible to machine such articles eccentrically so as to give additional wall thickness to a desired portion of the article. Moreover, it is possible to so forge article 50 with the proper design of external dies so as to provide extra metal deposits adjacent the ends of the article, thus enabling the manufacturer to machine such ends to provide socket-weld types of fittings, or recessed fittings suitable for cooperation with separate chill rings, or having an integral chill ring lip on the fitting itself.

In the event that the T 50 is to be made from stock 10 which has a large amount of excess metal to be displaced, as for example, in making a T having an extra heavy wall thickness, the closing of the dies in Figs. 15 and 16 may cause sufficient thickening of the walls of the article 40 to prevent the proper insertion of means 41 for the final operation. In such a case, the partially formed T 30 or unfinished T 40 may be deformed into the shape as shown in Figs. 17 and 18 in order to insure the proper and ready positioning of means 41 as shown in Figs. 19 and 20. Such temporary deformation, however, does not affect the important metal disposition in and adjacent to the outlet previously obtained by the closure of the dies in Figs. 15 and 16 when the unfinished T 40 is thus processed. After securing the sizing means 41 in place with the pull rod 42 attached, dies 11 and 12 may again be closed upon the partially formed T 30 or unfinished T 40 as shown in Figs. 21 and 22 and the means 41 may then be pulled through the outlet as shown in Figs. 23 and 24 in order to size the same.

In certain instances wherein the necessity for a definite wall thickness in the final product requires the use of stock 10 which has more excess metal than can be disposed of conveniently in the operations thus described, the invention may be carried out by including certain additional steps. Instances of this character may be found in the formation of T's having reduced outlets, or with double extra heavy walls and the like.

Assuming that the wall thickness $a$ of the desired T in Figs. 25 and 26 corresponds to double extra heavy requirements, the partially formed T 30 will be formed as shown in Figs. 9 and 10 with the exception that dimension $l$ may be greater than when a T of standard wall thickness is being made. Likewise, in such a case the space $k$ between dies 11 and 12 in Figs. 9 and 10 may be greater than when a T of standard wall thickness is being made.

Immediately after the operation shown in Figs. 9 and 10, an expanding or flaring means 31 of any suitable shape and size may be inserted into the article 30 without removing such article from the dies and may have a pull rod 32 secured thereto in any suitable manner as shown in Figs. 11 and 12. As an alternative the flaring means 31 may be inserted and held externally against the opening in article 30 to accomplish a substitute flaring operation. Thereafter, means 31 may be moved through or held against the outlet in order to widen and lengthen the same for subsequent operations. We prefer to move or hold means 31 independently of any concurrent movement of dies 11 and 12 although these movements could take place together if desired.

Moreover, the distance $k$ between dies 11 and 12 in Figs. 11 to 14 is preferably the same as the distance $k$ between those dies in Figs. 9 and 10 when using this form of our invention, although it is possible to reduce such distance in Figs. 11 to 14 by movement of dies 11 and 12 toward each other without departing from the invention, as when certain types of reducing T's are being made. It is also contemplated that a plurality of such steps involving a gradual increase in width of the outlet with commensurate reductions of distance $k$ between such dies can also be employed and a plurality of different expanding members 31 may then be used.

Following the operation shown in Figs. 11 to 14 the unfinished T 40 may then be reheated and again inserted in dies 11 and 12 which are then brought together as in Figs. 15 and 16. In the manufacture of reducing outlet T's and in instances wherein the final sizing means 41 can conveniently be inserted into the unfinished T and attached to pull rod 42, the step shown in Figs. 21 to 24 may then immediately take place without further heating.

Likewise, when it is necessary to deform the unfinished T 40 as in Figs. 17 and 18 this operation may be done at once and the operations of Figs. 19 to 24 carried out without further heating.

Whereas the invention as thus described will have application to the manufacture of branch outlet fittings of substantial wall thicknesses as for power piping and the like, it may also be employed in the manufacture of thin wall fittings of either ferrous or non-ferrous materials as for small pressure piping. In Figs. 27 to 30 the modified form of dies 51 and 52 having diameters $i$ and $h$ may be provided for use either in the formation of the blank 20 of substantial wall thickness or a similar blank of thin walls.

In case a thin wall stock 10 or a thin wall blank 20 is being used, the several stages of forging may be carried out as above described with cold working of the stock, blank, partially formed T and unfinished T. When necessary, the article may of course be annealed at various stages to relieve stresses and then recoiled to the amount necessary to insure the rigidity required for the practice of the invention.

As will be apparent to those skilled in the art, the invention provides a flexible process which may be adapted readily to the manufacture of fittings of many various types, sizes and characteristics. Although it is preferred to practice the invention as above indicated, it is obvious that additions to the process and apparatus may readily be made for solving problems of manufacture which may arise at times, as for example, in the use of special metals for making unusual shapes of fittings and such modifications are therefore considered to be within the scope of our invention.

Having thus described our invention, what we claim as new and desire to secure by Letters Patent is:

1. In a method of making a fitting having an outlet intermediate the ends thereof from tubular stock having a periphery greater than the periphery of the product to be formed, the steps including non-uniformly heating said stock, confining the stock within relatively movable spaced dies, with the hotter portion of the stock adjacent the outlet forming die, and moving said dies relatively toward each other, thereby thickening the heated side of said stock while displacing at least a portion of the excess material into the outlet region of the fitting on said thickened side thereof.

2. The method of making a fitting having a laterally projecting outlet intermediate the ends thereof, from non-uniformly heated, oval shaped tubular stock having its periphery greater than the periphery of the trunk of the fitting to be formed, which includes forming the outline of the fitting substantially completely by compression forces applied externally to said stock along lines substantially parallel with a major transverse axis of said stock and exclusively of the hotter region thereof at which said outlet is formed and then continuing the formation of the fitting by moving an outlet sizing means through said outlet region of said stock.

3. The method of making a T, which includes partially flattening a cylindrical stock piece to generally elliptical form, establishing substantially different temperatures along the length of the stock respectively adjacent the opposite ends of the major transverse axes of the stock, and applying external compressive forces to the stock along lines substantially parallel with the major axes thereof to reduce the elliptical stock to substantially circular form without substantially increasing the minor transverse axes of the stock, and thereby cause radial flow of metal from the hotter side into a laterally projecting outlet region and longitudinal flow between said outlet region and the ends of the stock.

4. The method of forming a T, which includes establishing substantially different temperatures respectively adjacent the opposite ends of the major transverse axes of a tubular metal stock of oval cross section, applying oppositely directed external compressive forces to said stock along lines substantially parallel with the major transverse axes thereof to reduce the major axes without substantially changing the minor transverse axes, and simultaneously permitting outward radial flow of metal along a limited area of the hotter side and from which the neck of the T may be later formed.

5. The method of forming a T, which includes providing a pair of relatively movable dies, each having a substantially semi-cylindrical die chamber, and one having an outlet passage leading from its die chamber, the diameter of said chambers being substantially that of the trunk of the desired T, applying oppositely directed compressive forces by said dies to a tubular, substantially cylindrical metal stock of larger diameter, to thereby deform said stock to oval shape with a minor axis not substantially greater than the diameter of the desired T, establishing substantially different temperatures along opposite sides of said oval tube at the opposite ends of the major axis, placing said oval tube between said dies with the hotter side in the die having the outlet passage, and moving said dies toward each other to reduce the major axis of said oval tube without substantially changing the minor axis, and to cause metal on the hotter side to flow into said outlet passage.

6. The method of forming a T, which includes heating a tubular metal member which is oval in cross-section, along the side at one end of the major axis, to a temperature at which the metal may readily flow under compressive forces with the side at the opposite end of the major axis substantially below that temperature, placing said oval member between a pair of dies each having a substantially semi-cylindrical die chamber with a diameter substantially equal to the minor axis of said member, the die receiving the hotter side of said member having an outlet passage intermediate of its ends, and applying oppositely directed compressive forces by said dies to said member in the direction of the major axis, to reduce said major axis without substantially increasing the minor axis, and to cause flow of the metal from the hotter side into said passage.

7. The method of forming a T, which includes heating a tubular metal member which is oval in cross-section, along the side at one end of the major axis, to a temperature at which the metal may readily flow under compressive forces with the side at the opposite end of the major axis substantially below that temperature, placing said oval member between a pair of dies each having a substantially semi-cylindrical die chamber with a diameter substantially equal to the minor axis of said member, the die receiving the hotter side of said member having an outlet passage intermediate of its ends, and applying oppositely directed compressive forces by said dies to said member in the direction of the major axis, to reduce said major axis without substantially increasing the minor axis, and to cause flow of the metal from the hotter side into said passage and thereafter forming the neck of the T from the portion of metal flowing into said passage.

8. The method of making a fitting having a laterally projecting outlet neck intermediate the ends thereof, which comprises providing a piece of tubular metal stock having a transverse area substantially greater than that of the trunk of the fitting to be formed, effecting a non-uniform heating of said stock such that the stock is hotter and of forging temperature in a region from which such outlet is to be formed, compressing the non-uniformly heated stock between relatively movable spaced external dies in a manner to reduce the transverse area of the stock and cause flow and displacement of a portion of the hotter metal of the stock laterally outward from the body of the stock into an outlet opening in said dies, and forming such outwardly displaced metal into a laterally projecting outlet neck.

9. The method of making a fitting having an outlet neck projecting laterally from the trunk of the fitting intermediate the ends thereof, which comprises providing a piece of tubular metal stock of generally oval cross-section and having a transverse area greater than that of the trunk of the fitting to be formed, effecting a non-uniform heating of said stock such that the stock is hotter and of a forging temperature in a region from which such outlet is to be formed, compressing the non-uniformly heated stock between external die means having die cavities relatively snugly receiving the more sharply curved sides of the oval stock, thereby to reduce the transverse area of the stock and cause flow and displacement of a portion of the hotter metal of the stock laterally outward from the body of the stock into an outlet opening in said die means, and forming such outwardly displaced metal into a laterally projecting outlet neck.

CHARLES J. HODAPP.
GILBERT A. GAUM.
FRANK N. SARBER.